US012625752B2

(12) United States Patent
Hwang et al.

(10) Patent No.: US 12,625,752 B2
(45) Date of Patent: May 12, 2026

(54) HIGH-SPEED TRANSMITTER CIRCUIT SYSTEM FOR ATTENUATING INTER-CHANNEL INTERFERENCE

(71) Applicant: Foundation of Soongsil University-Industry Cooperation, Seoul (KR)

(72) Inventors: Young-Ha Hwang, Seoul (KR); Yoochang Kim, Seoul (KR); Seunghoon Yi, Seoul (KR); Hee-Cheol Joo, Seoul (KR); Seung Chae Jung, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 69 days.

(21) Appl. No.: 18/741,741

(22) Filed: Jun. 12, 2024

(65) Prior Publication Data

US 2025/0315326 A1 Oct. 9, 2025

(30) Foreign Application Priority Data

Apr. 5, 2024 (KR) ......................... 10-2024-0046445

(51) Int. Cl.
*G06F 11/00* (2006.01)
*G06F 11/07* (2006.01)
(52) U.S. Cl.
CPC ........ *G06F 11/002* (2013.01); *G06F 11/0751* (2013.01)
(58) Field of Classification Search
None
See application file for complete search history.

(56) References Cited

U.S. PATENT DOCUMENTS 11,532,366 B2 * 12/2022 Park ....................... H03L 7/0812
2018/0166148 A1 * 6/2018 Huang .................... G06F 11/27
(Continued)

FOREIGN PATENT DOCUMENTS

KR 10-2018-0028976 A 3/2018
KR 10-2021-0033056 A 3/2021
(Continued)

OTHER PUBLICATIONS

Han-Gon Ko, et al., "An 8Gb/s/μm FFE-Combined Crosstalk-Cancellation Scheme for HBM on Silicon Interposer with 3D-Staggered Channels", 2020 IEEE International Solid-State Circuits Conference, Feb. 17, 2020, pp. 128-130, ISSCC 2020/Session 6/Ultra-High-Speed Wireline/6.7.

*Primary Examiner* — Anh Q Tran
(74) *Attorney, Agent, or Firm* — Park, Kim & Suh, LLC

(57) ABSTRACT

Disclosed is an inter-channel interference attenuation circuit system, which includes a plurality of channels provided between a memory and a processor and that transmits data received from the memory to the processor, and an interference attenuation circuit module connected one by one to each of the channels, and each of the channels is, a victim channel with respect to the connected interference attenuation circuit module, and an aggressive channel with respect to an adjacent interference attenuation circuit module, which is an interference attenuation circuit module connected to an adjacent channel which is interfered with by its own data transmission, and each of the interference attenuation circuit modules, adjusts an output signal of the connected victim channel based on the interference attenuation circuit module and the number of adjacent channels.

13 Claims, 12 Drawing Sheets

(56)                    References Cited

U.S. PATENT DOCUMENTS

2019/0235977 A1 *   8/2019  Kim ..................... G11C 29/022
2021/0258194 A1 *   8/2021  Jeong ............... H04L 25/03343

FOREIGN PATENT DOCUMENTS

KR      10-2021-0103969 A      8/2021
KR      10-2021-0125611 A      10/2021
KR      10-2022-0108265 A      8/2022

* cited by examiner

| Aggressor | | Victim |
|---|---|---|
| Left-side | Right-side | XTC |
| - | - | - |
| ↑ | ↓ | |
| ↓ | ↑ | |
| - | ↑ | ↓ |
| ↑ | - | |
| - | ↓ | ↑ |
| ↓ | - | |
| ↑ | ↑ | ↓↓ |
| ↓ | ↓ | ↑↑ |

FIG. 8

| Aggressor's PG Outputs | | | | Switches Inputs | | | |
|---|---|---|---|---|---|---|---|
| L_down | L_up | R_down | R_up | up_L | down_L | up_R | down_R |
| 0 (1-UI pulse) | 1 | 1 | 0 (1-UI pulse) | 1 | 1 | 1 | 1 |
| 0 (1-UI pulse) | 1 | 0 (1-UI pulse) | 1 | 0 (1-UI pulse) | 1 | 0 (1-UI pulse) | 1 |
| 0 (1-UI pulse) | 1 | 1 | 1 | 0 (1-UI pulse) | 1 | 1 | 1 |
| 1 | 0 (1-UI pulse) | 1 | 0 (1-UI pulse) | 1 | 0 (1-UI pulse) | 1 | 0 (1-UI pulse) |
| 1 | 0 (1-UI pulse) | 0 (1-UI pulse) | 1 | 1 | 1 | 1 | 1 |
| 1 | 0 (1-UI pulse) | 1 | 1 | 1 | 0 (1-UI pulse) | 1 | 1 |
| 1 | 1 | 0 (1-UI pulse) | 1 | 1 | 1 | 0 (1-UI pulse) | 1 |
| 1 | 1 | 1 | 0 (1-UI pulse) | 1 | 1 | 1 | 0 (1-UI pulse) |
| 1 | 1 | 1 | 1 | 1 | 1 | 1 | 1 |

FIG. 9

| | Block | Area (6ch) |
|---|---|---|
| 1 | Pattern gen. | 371um X 166um |
| 2 | Encoder | 225um X 135um |
| 3 | TX | 110um X 145um |
| 4 | Channel | 439um X 186um |
| 5 | RX | 50um X 80um |

Power breakdown

FIG. 12

|  | ISSCC'20 [20] | EL'22 [21] | This Work |
|---|---|---|---|
| Technology [nm] | 65 | 28 | 28 |
| XTC Structure | FFE+XTC | FFE+XTC | Digitally-Controlled FFE |
| Data Rate [Gb/s] | 4 | 4.5 | 12.8 |
| Throughput [Gb/s/μm] | 8 | 9 | 8.53 |
| Channel number | 6 | 6 | 5 |
| Channel Length [mm] | 6 (On-chip) | 3 (On-chip) | 3 (On-chip) |
| Energy Efficiency [pJ/b] | 1.4 | 1.2 | 0.373 |
| XTC Controllability | No | No | Yes |
| CIJ Reduction Ratio | 74 %* | 72 %** | *68 %** |
| TX Area [mm²] (†Normalized Area) | 0.046 (†0.0085) | ††0.0055 | 0.0069 |

HIGH-SPEED TRANSMITTER CIRCUIT SYSTEM FOR ATTENUATING INTER-CHANNEL INTERFERENCE

CROSS-REFERENCE TO RELATED APPLICATIONS

This application claims priority under 35 U.S.C. § 119 to Korean Patent Application No. 10-2024-0046445 filed on Apr. 5, 2024, in the Korean Intellectual Property Office, the disclosures of which are incorporated by reference herein in their entireties.

BACKGROUND

Embodiments of the present disclosure described herein relate to a high-speed transmitter circuit and a system that may cancel or attenuate inter-channel interference phenomena.

This present disclosure is carried out from research conducted as part of the PIM artificial intelligence semiconductor core technology development (R&D) (manufacturing) (Project identification number: 1415184150, Project number: 00155730, Research project name: Development of low-noise circuit technology for module interface for high-speed SCM memory, Project management agency: Korea Institute of Industrial Technology Planning and Evaluation, research period: 2023 Jan. 1 to 2023 Dec. 31) of the Ministry of Trade, Industry and Energy. Meanwhile, there is no property interest of the Korean government in any aspect of the present disclosure.

Depending on how Processing-in-Memory (PIM) is implemented, it may be divided into a Processing-in-chip, which adds logic that performs calculations in the same process as a memory cell, and a Processing-near-memory, which produces a separate package and modularizes it with the memory, or uses a stacked method using Through Silicon Via (TSV).

PIM semiconductors based on high-bandwidth stacked memory are known as a semiconductor chip technology that is implemented with an NPU and a GPU to maximize memory data access and data processing performance to enable real-time artificial intelligence calculation of large-scale data.

Low-noise memory interface technology for the PIM is a core circuit technology that overcomes memory barriers in high-performance computing systems implemented by high-bandwidth channels and low-noise interface circuits connecting the PIM semiconductors and the high-performance GPU/NPU.

SUMMARY

Embodiments of the present disclosure provide an inter-channel interference attenuation circuit and a system that may improve signal quality by removing or attenuating inter-channel interference phenomena.

In addition, embodiments of the present disclosure provide an inter-channel interference attenuation circuit and a system that may be implemented with low power and a small area compared to the conventional art, by implementing a circuit at the transmitting end that may cancel or attenuate inter-channel interference at the receiving end.

In addition, embodiments of the present disclosure provide an inter-channel interference attenuation circuit and a system that may control the attenuation of inter-channel interference compared to the conventional art.

According to an embodiment of the present disclosure, an inter-channel interference attenuation circuit system includes a plurality of channels provided between a memory and a processor and that transmits data received from the memory to the processor, and an interference attenuation circuit module connected one by one to each of the channels, and each of the channels is, a victim channel with respect to the connected interference attenuation circuit module, and an aggressive channel with respect to an adjacent interference attenuation circuit module, which is an interference attenuation circuit module connected to an adjacent channel which is interfered with by its own data transmission, and each of the interference attenuation circuit modules, adjusts an output signal of the connected victim channel based on the interference attenuation circuit module and the number of adjacent channels which are aggressive channels with respect to the victim channel and whose transmitted data changes from '0' to '1', and adjusts the output signal of the connected victim channel based on the interference attenuation circuit module and the number of adjacent channels which are aggressive channels with respect to the victim channel and whose transmitted data changes from '1' to '0'.

According to an embodiment, the each of the interference attenuation circuit modules, may receive an encoder input signal generated by the data transmission of the each aggressive channel from the adjacent interference attenuation circuit module connected to at least one aggressive channel with respect to the connected victim channel, and may adjust the output signal of the connected victim channel based on the at least one received encoder input signal.

According to an embodiment, the each of the interference attenuation circuit modules, when data transmitted by a first aggressive channel with respect to the connected victim channel changes from '0' to '1', may receive a first up encoder input signal from a first adjacent interference attenuation circuit module, which is an adjacent interference attenuation circuit module connected to the first aggressive channel, when the data transmitted by the first aggressive channel with respect to the connected victim channel changes from '1' to '0', may receive a first down encoder input signal from the first adjacent interference attenuation circuit module, when data transmitted by a second aggressive channel with respect to the connected victim channel changes from '0' to '1', may receive a second up encoder input signal from a second adjacent interference attenuation circuit module, which is an adjacent interference attenuation circuit module connected to the second aggressive channel, and when the data transmitted by the second aggressive channel with respect to the connected victim channel changes from '1' to '0', may receive a second down encoder input signal from the second adjacent interference attenuation circuit module.

According to an embodiment, the each of the interference attenuation circuit modules, may further include a first switching element provided between an output node connected to the corresponding victim channel and a first voltage source, and a second switching element provided between the output node and a first ground, and the first switching element may electrically connect the first voltage source to the output node depending on a first control signal generated based on data received by a data input terminal which receives data to be transmitted to the victim channel from the memory, and the second switching element may electrically connect the output node to the first ground depending on a second control signal generated based on data received by the data input terminal.

According to an embodiment, the each of the interference attenuation circuit modules, may further include a third switching element provided between the output node and a second voltage source, a fourth switching element provided between the output node and the second voltage source, a fifth switching element provided between the output node and a second ground, and a sixth switching element provided between the output node and the second ground, and the third switching element may electrically connect the second voltage source to the output node depending on a third control signal generated based on the encoder input signals, the fourth switching element may electrically connect the second voltage source to the output node depending on a fourth control signal generated based on the encoder input signals, the fifth switching element may electrically connect the second ground to the output node depending on a fifth control signal generated based on the encoder input signals, and the sixth switching element may electrically connect the second ground to the output node depending on a sixth control signal generated based on the encoder input signals.

According to an embodiment, the each of the interference attenuation circuit modules may generate the third control signal, the fourth control signal, the fifth control signal, and the sixth control signal, based on whether the first up encoder input signal is received, whether the first down encoder input signal is received, whether the second up encoder input signal is received, and whether the second down encoder input signal is received, respectively.

According to an embodiment, the each of the interference attenuation circuit modules, may generate the third control signal when the first down encoder input signal from the first adjacent interference attenuation circuit module is received and the second up encoder input signal from the second adjacent interference attenuation circuit module is not received, may generate the fourth control signal when the second down encoder input signal from the second adjacent interference attenuation circuit module is received and the first up encoder input signal from the first adjacent interference attenuation circuit module is not received, may generate the fifth control signal when the first up encoder input signal from the first adjacent interference attenuation circuit module is received and the second down encoder input signal from the second adjacent interference attenuation circuit module is not received, and may generate the sixth control signal when the second up encoder input signal is received from the second adjacent interference attenuation circuit module and the first down encoder input signal is not received from the first adjacent interference attenuation circuit module.

According to an embodiment, the each of the interference attenuation circuit modules, may further include an up signal generating driver provided between a gate terminal of the first switching element and the data input terminal and that generates an up encoder input signal based on a change in data received through the data input terminal, and a down signal generating driver provided between a gate terminal of the second switching element and the data input terminal and that generates a down encoder input signal based on the change in data received through the data input terminal.

According to an embodiment, the each of the interference attenuation circuit modules, may receive the first up encoder input signal from the up signal generating driver of the first adjacent interference attenuation circuit module, may receive the first down encoder input signal from the down signal generating driver of the first adjacent interference attenuation circuit module, may receive the second up encoder input signal from the up signal generating driver of the second adjacent interference attenuation circuit module, and may receive the second down encoder input signal from the down signal generating driver of the second adjacent interference attenuation circuit module.

According to an embodiment, the each of the interference attenuation circuit modules, may further include a pulse encoder that generates a driver input signal and a switch input signal based on the encoder input signal, at least one pre-driver electrically connected to the pulse encoder and that generates a strength control signal with a magnitude corresponding to a fine-tuning digital code when the fine-tuning digital code and the driver input signal are received, and at least one switch module electrically connected to the pulse encoder and the pre-driver, and that generates a control signal with a magnitude corresponding to the strength control signal and a range adjustment digital code when the strength control signal, the range adjustment digital code, and the switch input signal are received.

According to an embodiment, the pre-driver may include an up pre-driver and a down pre-driver, and the pulse encoder, when the interference attenuation circuit module receives at least one of the first up encoder input signal and the second up encoder input signal, may transmit the driver input signal to the up pre-driver, and when the interference attenuation circuit module receives at least one of the first down encoder input signal and the second down encoder input signal, may transmit the driver input signal to the down pre-driver.

According to an embodiment, the pulse encoder, when the first down encoder input signal is received and the second up encoder input signal is not received, may generate a first up switch input signal, when the second down encoder input signal is received and the first up encoder input signal is not received, may generate a second up switch input signal, when the first up encoder input signal is received and the second down encoder input signal is not received, may generate a first down switch input signal, and when the second up encoder input signal is received and the first down encoder input signal is not received, may generate a second down switch input signal.

According to an embodiment, the switch module may include a first up switch module and a second up switch module, and the first up switch module, when the strength control signal from the up pre-driver is received and the first up switch input signal from the pulse encoder is received, may generate the third control signal with a magnitude corresponding to the strength control signal and the range adjustment digital code so as to be transmitted to a gate terminal of the third switching element, and the second up switch module, when the strength control signal from the up pre-driver is received and the second up switch input signal from the pulse encoder is received, may generate the fourth control signal with a magnitude corresponding to the strength control signal and the range adjustment digital code so as to be transmitted to a gate terminal of the fourth switching element.

According to an embodiment, the switch module may include a first down switch module and a second down switch module, and the first down switch module, when the strength control signal from the down pre-driver is received and the first down switch input signal from the pulse encoder is received, may generate the fifth control signal with a magnitude corresponding to the strength control signal and the range adjustment digital code so as to be transmitted to a gate terminal of the fifth switching element, and the second down switch module, when the strength control signal from the down pre-driver is received and the second down switch input signal from the pulse encoder is received, may generate the sixth control signal with a magnitude corresponding to the strength control signal and the range adjustment digital code so as to be transmitted to a gate terminal of the sixth switching element.

BRIEF DESCRIPTION OF THE FIGURES

The above and other objects and features of the present disclosure will become apparent by describing in detail embodiments thereof with reference to the accompanying drawings.

FIG. 6 is a diagram for describing an operation of interference attenuation circuit modules connected one by one to a victim channel and an aggressive channel, according to an embodiment.

FIG. 7 is a truth table of a crosstalk cancellation method, according to an embodiment.

FIG. 8 is a truth table of a pulse encoder, according to an embodiment.

FIG. 9 is a diagram for describing an example of a pull-up situation, according to an embodiment.

FIG. 12 is a table comparing performance of a crosstalk cancellation circuit, according to a conventional art and an embodiment.

DETAILED DESCRIPTION

Figure 1:
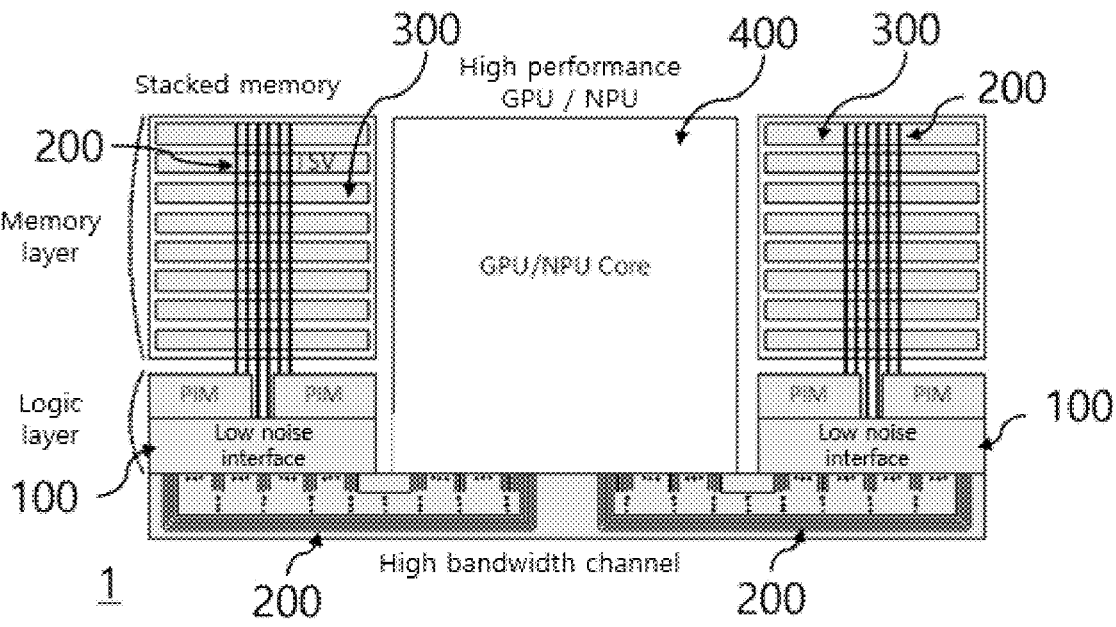
FIG. 1 is a diagram for describing an operation of an inter-channel interference attenuation circuit system, according to an embodiment.

The same reference numerals denote the same elements throughout the specification. In the specification, all elements of embodiments are not described, and general contents in the art to which the disclosed disclosure belongs or repeated contents between the embodiments will not be described. The term '~module' used in the specification may be implemented by using software or hardware, and depending on embodiments, multiple '~modules' may be implemented as one component, or one 'module' may include a plurality of components.

Throughout the specification, when a part is said to be "connected" to another part, this includes cases where it is electrically connected. In addition, when a part is said to be "connected" to another part, it includes not only the case where it is directly connected, but also the case where it is indirectly connected, and an indirect connection includes cases where a completely different configuration is connected between any of the above-mentioned parts and another part.

In addition, when a part "includes" an element, another element may be further included, rather than excluding the existence of another element, unless otherwise described. Terms "first", "second", and the like are used herein to distinguish one element from another element, and the elements are not limited to the terms described above. As used herein, singular forms "a" and "an" are intended to include plural forms as well, unless the context clearly indicates otherwise. Reference numerals in operations are used for the sake of convenience of description and do not describe an order of the operations, and the operations may be performed through an order different from the described order unless the context clearly indicates a specific order.

Hereinafter, a principle of action and embodiments of the present disclosure will be described with reference to the accompanying drawings.

FIG. 1 is a diagram for describing an operation of an inter-channel interference attenuation circuit system, according to an embodiment.

Referring to FIG. 1, an inter-channel interference attenuation circuit system 1 may include a plurality of channels 200 and a plurality of interference attenuation circuit modules 100 corresponding to each channel 200, one by one. In this case, the plurality of channels 200 may correspond to not only high-bandwidth channels but also TSVs (Through Silicon Vias) in a stacked memory area. In detail, even if the TSV is located near the stacked memory, it may correspond to the channel 200 as a separate configuration from a memory 300.

The inter-channel interference attenuation circuit system 1 according to an embodiment may be a system applied to a high-bandwidth stacked memory-based semiconductor device. A high-bandwidth stacked memory-based PIM semiconductor may be a chip technology that is implemented with a processor 400 such as an NPU and a GPU to access data in the memory 300 and maximize data processing performance to enable real-time artificial intelligence calculation of large-scale data. Meanwhile, the inter-channel interference attenuation circuit system 1 does not necessarily have to be applied only to the high-bandwidth stacked memory, or the processor 400 is not necessarily limited to the NPU and the GPU.

The interference attenuation circuit module 100 may be included in a low-noise memory interface for the PIM. A high-bandwidth channel and low-noise interface circuit connecting the PIM semiconductor and the high-performance GPU/NPU may be a configuration that overcomes the memory barriers in a high-performance computing system.

The inter-channel interference attenuation (or cancellation) circuit system 1 according to an embodiment may efficiently implement cancellation of crosstalk between the channels 200 in an analog method (compensation based on current or charge in time-domain) in terms of the area occupied by a device and the power consumed.

Figure 2:
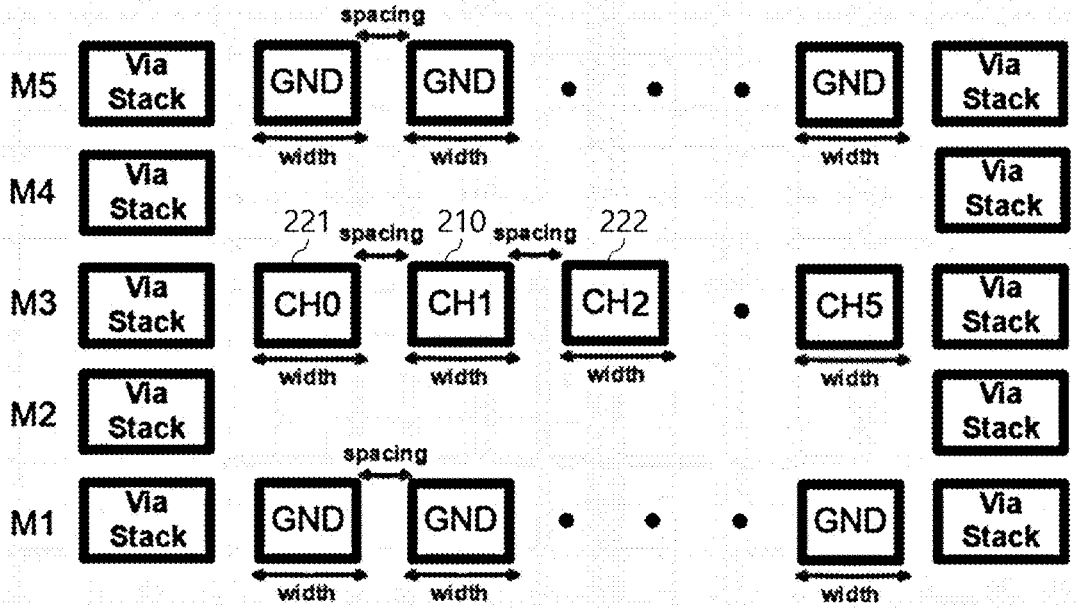
FIG. 2 is a diagram illustrating channels arranged in a two-dimensional arrangement, according to an embodiment.

FIG. 2 is a diagram illustrating channels arranged in a two-dimensional arrangement, according to an embodiment.

As illustrated in FIG. 2, although the channels 200 are arranged two-dimensionally, a three-dimensional cross-sectional view including ground shielding channels may be seen overall.

Referring to FIG. 2, since the arrangement of the channels 200 is 2-dimensional, only crosstalk coming from the two adjacent channels 200 may also be considered.

In this case, the adjacent channel of a victim channel 210 located to the left side of the victim channel 210 may be a first aggressor channel 221 with respect to the victim channel 210, and the adjacent channel of the victim channel 210 located to the right side of the victim channel 210 may be a second aggressor channel 222 with respect to the victim channel 210. However, the number of adjacent channels affecting the victim channel 210 is not limited to two, or it is not necessarily limited to being defined as the first aggressor channel 221 and the second aggressor channel 222 according to the left and right sides.

Figure 3:
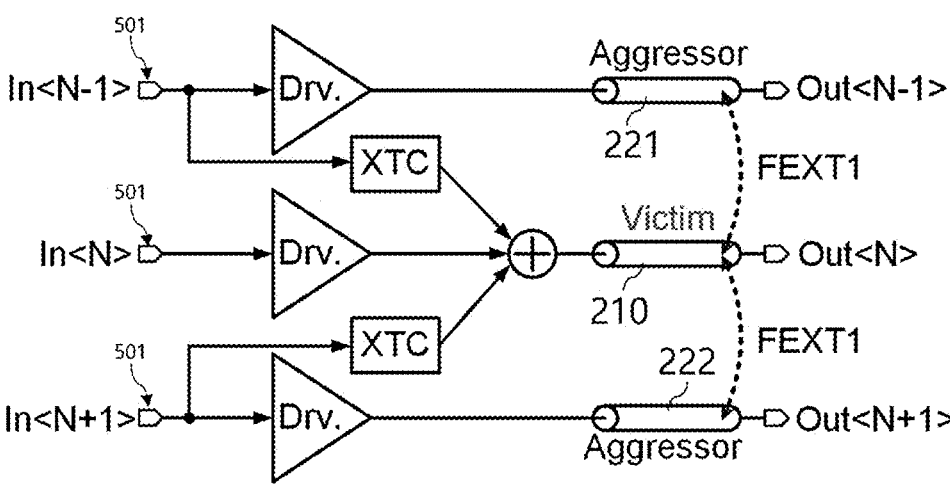
FIG. 3 is a diagram illustrating crosstalk cancellation (XTC) applied based on a feedforward equalizer, according to an embodiment.

FIG. 3 is a diagram illustrating crosstalk cancellation (XTC) applied based on a feedforward equalizer, according to an embodiment.

Referring to FIG. 3, in the case of high-bandwidth channels, the channels 200 are close together, causing inter-channel interference (crosstalk), which deteriorates signal quality, so circuit structure and circuit implementation that may cancellate or attenuate inter-channel interference may be essential.

According to one embodiment, the inter-channel interference attenuation circuit system 1 for transmitting data may adopt a method of signaling through each channel 200 by compensating for an FEXT applied to the victim channel 210 in advance depending on the data pattern transmitted by an aggressor channel 220 adjacent to the victim channel 210. In this case, the FEXT occurs when there is a transition in the data (aggressor data) of the aggressor channel 220, so an FEXT pre-compensation may be performed on the victim channel by converting the data transition into a pulse form.

Figure 4:
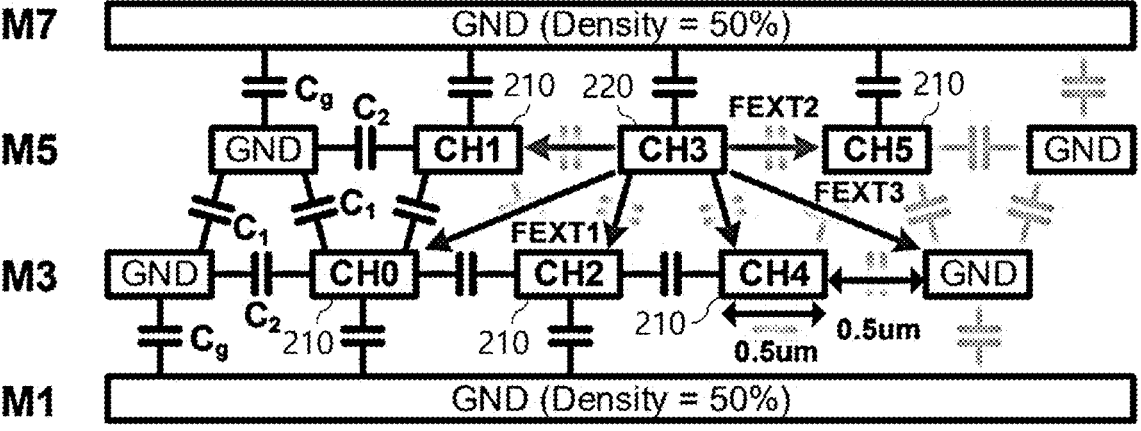
FIG. 4 is a diagram illustrating channels arranged in a three-dimensional arrangement, according to an embodiment.

FIG. 4 is a diagram illustrating channels arranged in a three-dimensional arrangement, according to an embodiment.

Referring to FIG. 4, since the arrangement of the channels 200 is 3-dimensional, there may be cases where not only the crosstalk coming from the two adjacent channels on both sides but also the crosstalk coming from the adjacent channel below should be considered.

The inter-channel interference attenuation circuit system 1 according to an embodiment illustrates a circuit that considers the crosstalk coming from the first aggressor channel 221 and the second aggressor channel 222, which are two adjacent channels on both sides of the victim channel 210 as an example, but the proposed technical features are applicable even if the number of adjacent channels with respect to the victim channel 210 increases.

Referring to FIGS. 1, 2, 3, and 4, the plurality of channels 200 may be provided between the memory 300 and the processor 400, respectively. The plurality of channels 200 may each transmit data received from the memory 300 to the processor 400.

Each channel 200 may be interfered with by data transmission of adjacent channels 200. In this case, the adjacent channel 200 that interferes with one channel 200 may be an adjacent channel. Additionally, the channel receiving interference may be the victim channel 210 relative to the aggressor channel 220.

The plurality of interference attenuation circuit modules 100 may be connected one by one to each channel 200.

Each channel 200 may be the victim channel 210 with respect to the connected interference attenuation circuit module 100 and at the same time, may be the aggressor channel 220 with respect to the adjacent interference attenuation circuit module 100, which is the interference attenuation circuit module 100 connected to an adjacent channel that is interfered with by its own data transmission.

In detail, each channel 200 is not always determined as the victim channel 210 and the aggressor channel 220, but each channel 200 may be the victim channel 210 for itself and for the interference attenuation circuit module 100 connected to it, and may be the aggressor channel 220 for its adjacent channel and the interference attenuation circuit module 100 connected to the corresponding adjacent channel.

Each interference attenuation circuit module 100 may adjust the output signal of the victim channel 210 connected to it based on the number of adjacent channels in which a change in a specific data transmission occurs.

Each interference attenuation circuit module 100 may adjust the output signal of the connected victim channel 210 based on the number of adjacent channels that are the aggressor channel 220 for the interference attenuation circuit module 100 and the victim channel 210 and whose transmitted data changes from '0' to '1'.

Each interference attenuation circuit module 100 may adjust the output signal of the connected victim channel 210 based on the number of adjacent channels that are the aggressor channel 220 for the interference attenuation circuit module 100 and the victim channel 210 and whose transmitted data changes from '1' to '0'.

Figure 5:
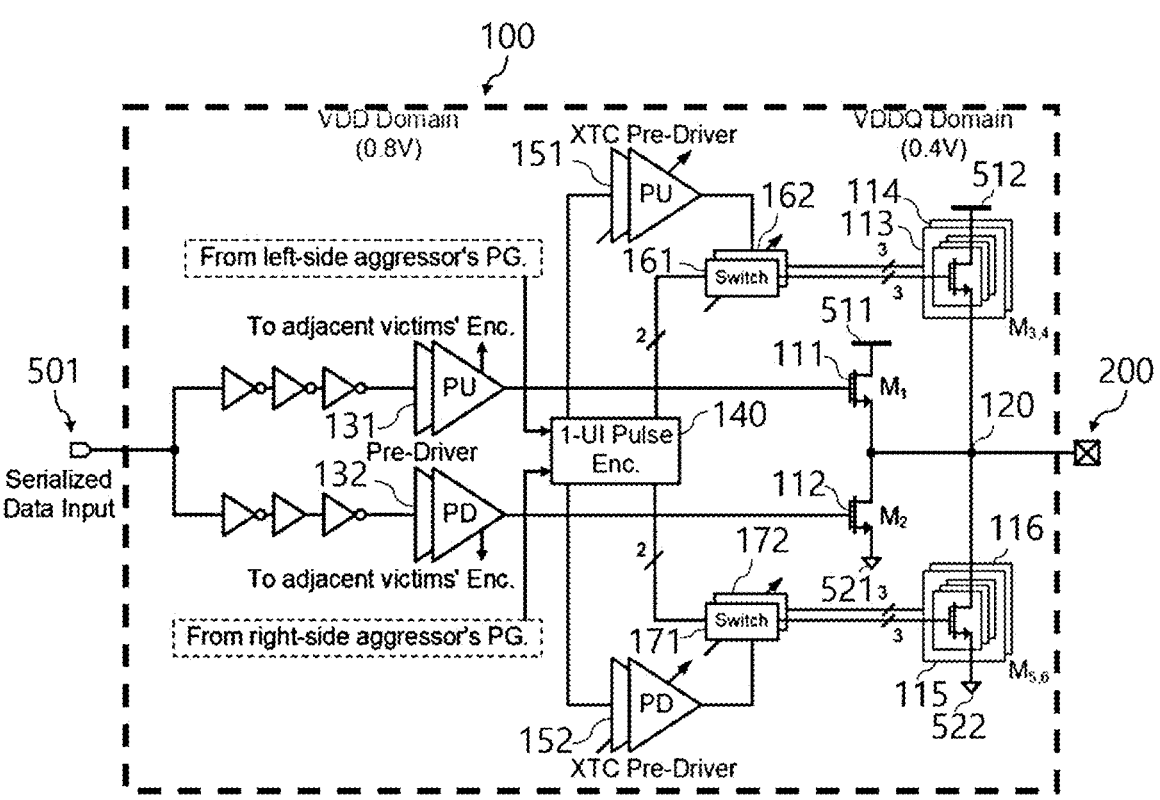
FIG. 5 is a diagram illustrating one interference attenuation circuit module, according to an embodiment.

FIG. 5 is a diagram illustrating one interference attenuation circuit module, according to an embodiment.

Referring to FIG. 5, a detail circuit implementation of the interference attenuation circuit module 100, which is a transmitter according to an embodiment, may be confirmed.

When a data transition that generates the FEXT is detected from the aggressor channel 220 to the victim channel 210, the interference attenuation circuit module 100 may apply a 1-UI pulse to a 1-UI pulse encoder 140 for the XTC of the victim channel 210. The pulse encoder (1-UI Pulse Encoder) 140 may determine whether to perform the XTC according to the data pattern of the aggressor channels 220, and optimal crosstalk cancellation (XTC) may be performed through digitally controllable pre-drivers (Fine tuning XTC Pre-Drivers) and switch modules (Coarse tuning XTC Switches).

Each interference attenuation circuit module 100 may include a first switching element 111, a second switching element 112, a third switching element 113, a fourth switching element 114, a fifth switching element 115, a sixth switching element 116, an output node 120, an up signal generating driver 131, a down signal generating driver 132, the pulse encoder 140, an up pre-driver 151, a down pre-driver 152, a first up switch module 161, a second up switch module 162, a first down switch module 171, and a second down switch module 172.

The up signal generating driver (Pre-Driver_PU) 131, the down signal generating driver (Pre-Driver_PD) 132, the first switching element (M1) 111, and the second switching element (M2) 112 may be a configuration of a TX Driver circuit for transmitting data of the memory 300 to the processor 400.

The pulse encoder 140, the up pre-driver (XTC Pre-Driver_PU) 151, the down pre-driver (XTC Pre-Driver_PD) 152, the first up switch module (Switch) 161, the second up switch module (Switch) 162, the first down switch module (Switch) 171, the second down switch module (Switch) 172, the third switching element (M3) 113, the fourth switching element (M4) 114, the fifth switching element (M5) 115, and the sixth switching element (M6) 116 may be a configuration of a circuit to cancel crosstalk.

The pulse encoder 140, the up pre-driver 151, and the down pre-driver 152 may each include at least one logic gate. In this case, the logic gates provided in the pulse encoder 140, the up pre-driver 151, and the down pre-driver 152 are not necessarily limited to the gates illustrated.

Each switching element included in the inter-channel interference attenuation circuit system 1 may include an element that electrically connects or opens two nodes when a control signal is received. For example, the switching element may include a transistor element that electrically connects an emitter terminal and a collector terminal when a control signal is received from a base terminal, thereby allowing current to flow from the emitter terminal to the collector terminal. Alternatively, the switching element may include an N-channel MOSFET element that electrically connects a drain terminal and a source terminal when a control signal is received at a gate terminal, thereby allowing current to flow from the drain terminal to the source terminal. In detail, the switching element according to an embodiment may include a thin film transistor (TFT) as described above.

The third switching element (M3) 113, the fourth switching element (M4) 114, the fifth switching element (M5) 115, and the sixth switching element (M6) 116 may be each configured with a plurality of transistors. For example, the third switching element (M3) 113, the fourth switching element (M4) 114, the fifth switching element (M5) 115, and the sixth switching element (M6) 116 may each be a switching element composed of three transistors of different sizes.

Figure 6:
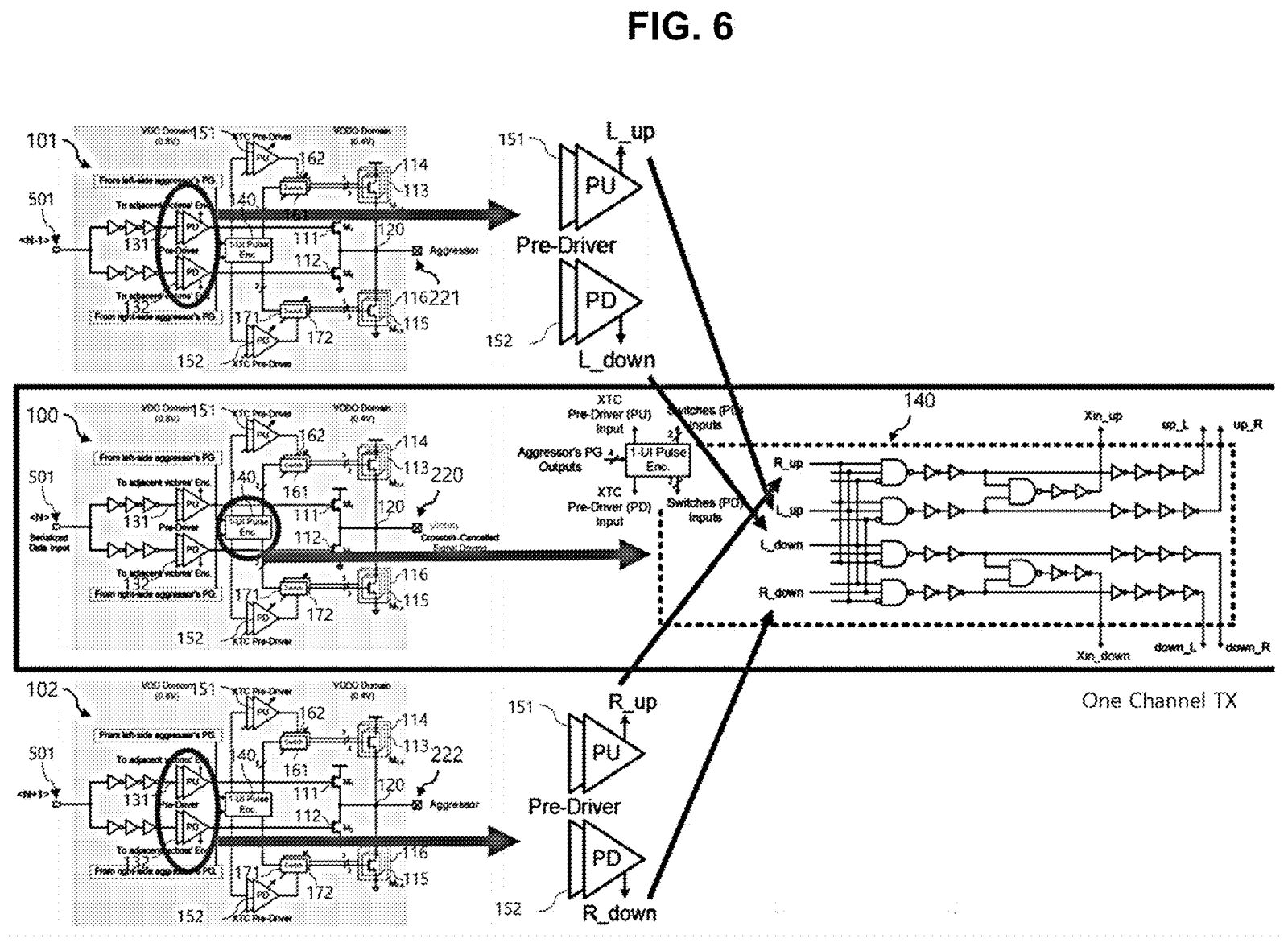

FIG. 6 is a diagram for describing an operation of interference attenuation circuit modules 100 connected one by one to a victim channel and an aggressive channel, according to an embodiment.

Referring to FIGS. 5 and 6, each interference attenuation circuit module 100 may receive an encoder input signal generated by data transmission of each aggressor channel 220 from the adjacent interference attenuation circuit module 100 connected to at least one aggressor channel 220 with respect to the connected victim channel 210.

Each interference attenuation circuit module 100 may be configured to adjust the output signal of the connected victim channel 210 based on at least one encoder input signal which is received.

A first adjacent interference attenuation circuit module 101 may be an adjacent interference attenuation circuit module connected to the first aggressor channel 221. A second adjacent interference attenuation circuit module 102 may be an adjacent interference attenuation circuit module connected to the second aggressor channel 222.

Each interference attenuation circuit module 100, when the data transmitted by the first aggressor channel 221 for the connected victim channel 210 changes from '0' to '1', may receive a first up encoder input signal L_up from the first adjacent interference attenuation circuit module 101.

Each interference attenuation circuit module 100, when the data transmitted by the first aggressor channel 221 for the connected victim channel 210 changes from '1' to '0', may receive a first down encoder input signal L_down from the first adjacent interference attenuation circuit module 101.

Each interference attenuation circuit module 100, when the data transmitted by the second aggressor channel 222 for the connected victim channel 210 changes from '0' to '1', may receive a second up encoder input signal R_up from the second adjacent interference attenuation circuit module 102.

Each interference attenuation circuit module 100, when the data transmitted by the second aggressor channel 222 for the connected victim channel 210 changes from '1' to '0', may receive a second down encoder input signal R_down from the second adjacent interference attenuation circuit module 102.

A first voltage source 511 and a second voltage source 512 may be the same voltage source or may be separate voltage sources. A first ground 521 and a second ground 522 may be the same ground.

The output node 120 may be a node connected to the victim channel 210 among the nodes included in the interference attenuation circuit module 100.

The first switching element 111 may be provided between the corresponding output node 120 and the first voltage source 511.

A data input terminal 501 may be connected to the memory 300. The data input terminal 501 may receive data from the memory 300.

The first switching element 111 may be configured to electrically connect the first voltage source 511 to the output node 120 depending on a first control signal generated based on the data received by the data input terminal 501, which receives data to be transmitted to the victim channel 210 from the memory 300.

The second switching element 112 may be provided between the output node 120 and the first ground 521.

The second switching element 112 may be configured to electrically connect the output node 120 to the first ground 521 depending on a second control signal generated based on the data received by the data input terminal 501.

The third switching element 113 may be provided between the output node 120 and the second voltage source 512. The third switching element 113 may electrically connect the second voltage source 512 to the output node 120 depending on a third control signal generated based on encoder input signals.

The fourth switching element 114 may be provided between the output node 120 and the second voltage source 512. The fourth switching element 114 may electrically connect the second voltage source 512 to the output node 120 depending on a fourth control signal generated based on encoder input signals.

The fifth switching element 115 may be provided between the output node 120 and the second ground 522. The fifth switching element 115 may electrically connect the second ground 522 to the output node 120 depending on a fifth control signal generated based on encoder input signals.

The sixth switching element 116 may be provided between the output node 120 and the second ground 522. The sixth switching element 116 may electrically connect the second ground 522 to the output node 120 depending on a sixth control signal generated based on encoder input signals.

Each interference attenuation circuit module 100 may generate the third control signal based on whether the first up encoder input signal L_up is received, whether the first down encoder input signal L_down is received, whether the second up encoder input signal R_up is received, and whether the second down encoder input signal R_down is received.

Each interference attenuation circuit module 100 may generate the fourth control signal based on whether the first up encoder input signal L_up is received, whether the first down encoder input signal L_down is received, whether the second up encoder input signal R_up is received, and whether the second down encoder input signal R_down is received.

Each interference attenuation circuit module 100 may generate the fifth control signal based on whether the first up encoder input signal L_up is received, whether the first down encoder input signal L_down is received, whether the second up encoder input signal R_up is received, and whether the second down encoder input signal R_down is received.

Each interference attenuation circuit module 100 may generate the sixth control signal based on whether the first up encoder input signal L_up is received, whether the first down encoder input signal L_down is received, whether the second up encoder input signal R_up is received, and whether the second down encoder input signal R_down is received.

Each interference attenuation circuit module 100 may generate the third control signal when the second up encoder input signal R_up is not received from the second adjacent interference attenuation circuit module 102 while the first down encoder input signal L_down is received from the first adjacent interference attenuation circuit module 101.

Each interference attenuation circuit module 100 may generate the fourth control signal when the first up encoder input signal L_up is not received from the first adjacent interference attenuation circuit module 101 while the second down encoder input signal R_down is received from the second adjacent interference attenuation circuit module 102.

Each interference attenuation circuit module 100 may generate the fifth control signal when the second down encoder input signal R_down is not received from the second adjacent interference attenuation circuit module 102 while the first up encoder input signal L_up is received from the first adjacent interference attenuation circuit module 101.

Each interference attenuation circuit module 100 may generate the sixth control signal when the first down encoder input signal L_down is not received from the first adjacent interference attenuation circuit module 101 while the second up encoder input signal R_up is received from the second adjacent interference attenuation circuit module 102.

The up signal generating driver 131 may be provided between a gate terminal of the first switching element 111 and the data input terminal 501. The up signal generating driver 131 may generate an encoder input signal based on changes in data received by the data input terminal 501.

The down signal generating driver 132 may be provided between a gate terminal of the second switching element 112 and the data input terminal 501. The down signal generating driver 132 may generate the down encoder input signal based on changes in data received by the data input terminal 501.

Each interference attenuation circuit module 100 may receive the first up encoder input signal L_up from the up signal generating driver 131 of the first adjacent interference attenuation circuit module 101.

Each interference attenuation circuit module 100 may receive the first down encoder input signal L_down from the down signal generating driver 132 of the first adjacent interference attenuation circuit module 101.

Each interference attenuation circuit module 100 may receive the second up encoder input signal R_up from the up signal generating driver 131 of the second adjacent interference attenuation circuit module 102.

Each interference attenuation circuit module 100 may receive the second down encoder input signal R_down from the down signal generating driver 132 of the second adjacent interference attenuation circuit module 102.

FIG. 7 is a truth table of a crosstalk cancellation method, according to an embodiment.

The feature of the inter-channel interference attenuation circuit system 1 according to an embodiment may be a method of calculating a current that compensates for crosstalk and a circuit implementation thereof. The described truth table is a truth table that compensates for crosstalk, and the pulse encoder 140 may be a circuit that generates a 1 UI pulse based on this truth table.

Instead of calculating complex crosstalk compensation current, the inter-channel interference attenuation circuit system 1 according to one embodiment may be configured to finely control the compensation current by determining whether to perform the interference attenuation (i.e., the crosstalk cancellation) based on data from the adjacent channel 200 and the strength in only two steps, and by adjusting the size of the switch that compensates for a current and the shape of the 1 UI pulse that turns on the switch.

FIG. 8 is a truth table of a pulse encoder, according to an embodiment.

Referring to FIGS. 5, 6, 7, and 8, the pulse encoder 140 may selectively perform crosstalk compensation by selecting only when the crosstalk cancellation is necessary.

In the truth table illustrated, the meaning of '0' on Aggressor's PG Outputs may mean that a data change in the aggressor channel 220 is detected. Additionally, the meaning of '1' on Aggressor's PG Outputs may mean that there is no change in data in the aggressor channel 220.

In the truth table illustrated, the meaning of '0' on Switches Inputs may mean that a signal performing the crosstalk cancellation XTC is generated. Additionally, the meaning of '1' on the Switches Inputs may mean that a signal performing the crosstalk cancellation XTC is not generated.

The first up encoder input signal L_up, the second up encoder input signal R_up, the first down encoder input signal L_down, and the second down encoder input signal R_down may all be a 1-UI pulse signal, which is the input signal with respect to the pulse encoder 140.

A first up switch input signal up_L, a second up switch input signal up_R, a first down switch input signal down_L, a second down switch input signal down_R, and driver input signals Xin_up and Xin_down may also all be a 1-UI pulse signal, which is the output signal of the pulse encoder 140.

When there is an event where data changes from '0' to '1' in the first aggressor channel 221, which is the left aggressor channel of the victim channel 210, the up pre-driver (Pull-Up (PU) Pre-Driver) 151 of the corresponding aggressor channel 220 may output a pulse (Active-low 1-UI pulse) that goes down from '1' to '0' for 1-UI and then returns to '1', and this pulse may be the first up encoder input signal L_up.

When there is an event where data changes from '0' to '1' in the second aggressor channel 222, which is the right aggressor channel of the victim channel 210, the up pre-driver 151 of the corresponding aggressor channel 220 may output a pulse (Active-low 1-UI pulse) that goes down from '1' to '0' for 1-UI and then returns to '1', and this pulse may be the second up encoder input signal R_up.

When there is an event where data changes from '1' to '0' in the first aggressor channel 221, which is the left aggressor channel of the victim channel 210, the down pre-driver (Pull-Down (PD) Pre-Driver) 152 of the corresponding aggressor channel 220 may output a pulse (Active-low 1-UI pulse) that goes down from '1' to '0' for 1-UI and then returns to '1', and this pulse may be the first down encoder input signal L_down.

When there is an event where data changes from '1' to '0' in the second aggressor channel 222, which is the right aggressor channel of the victim channel 210, the down pre-driver 152 of the corresponding aggressor channel 220 may output a pulse (Active-low 1-UI pulse) that goes down from '1' to '0' for 1-UI and then returns to '1', and this pulse may be the second down encoder input signal R_down.

When either the first up encoder input signal L_up or the second up encoder input signal R_up becomes an active-low 1-UI pulse signal, the signal Xin_up among the driver input signals may be the Active-low 1-UI pulse that goes down from '1' to '0' for 1-UI and then returns to '1'.

When either the first down encoder input signal L_down or the second down encoder input signal R_down becomes an active-low 1-UI pulse signal, the signal Xin_down among the driver input signals may also be the Active-low 1-UI pulse that goes down from '1' to '0' for 1-UI and then returns to '1'.

The first up switch input signal up_L, the second up switch input signal up_R, the first down switch input signal down_L, and the second down switch input signal down_R may be the Active-low 1-UI pulse that goes down from '1' to '0' for 1-UI and then returns to '1' when the crosstalk cancellation XTC should be performed depending on the first up encoder input signal L_up, the first down encoder input signal L_down, the second up encoder input signal R_up, and the second down encoder input signal R_down.

The pulse encoder 140 may be configured to generate the driver input signal Xin_up or Xin_down and a switch input signal based on the encoder input signal. The switch input signal may be at least one of the first up switch input signal up_L, the second up switch input signal up_R, the first down switch input signal down_L, and the second down switch input signal down_R.

Each pre-driver may be electrically connected to the pulse encoder 140. When the fine-tuning digital code and the driver input signal Xin_up or Xin_down are received, the pre-driver may generate a strength control signal with a level corresponding to the fine-tuning digital code. The pre-driver may include the up pre-driver 151 and the down pre-driver 152.

Each switch module may be electrically connected to the pulse encoder 140 and the pre-driver. Each switch module may be configured to generate a control signal with a level corresponding to the strength control signal and the range adjustment digital code when the strength control signal, the range adjustment digital code, and the switch input signal are received.

When the interference attenuation circuit module 100 receives at least one of the first up encoder input signal L_up and the second up encoder input signal R_up, the pulse encoder 140 may transmit the driver input signal Xin_up to the up pre-driver 151.

When the interference attenuation circuit module 100 receives at least one of the first down encoder input signal L_down and the second down encoder input signal R_down, the pulse encoder 140 may transmit the driver input signal Xin_down to the down pre-driver 152.

The pulse encoder 140 may generate the first up switch input signal up_L when the first down encoder input signal is received but the second up encoder input signal is not received.

The pulse encoder 140 may generate the second up switch input signal up_R when the second down encoder input signal is received but the first up encoder input signal is not received.

When the pulse encoder 140 may generate the first down switch input signal down_L when the first up encoder input signal is received but the second down encoder input signal is not received.

When the pulse encoder 140 may generate the second down switch input signal down_R when the second up encoder input signal is received but the first down encoder input signal is not received.

Figure 9:
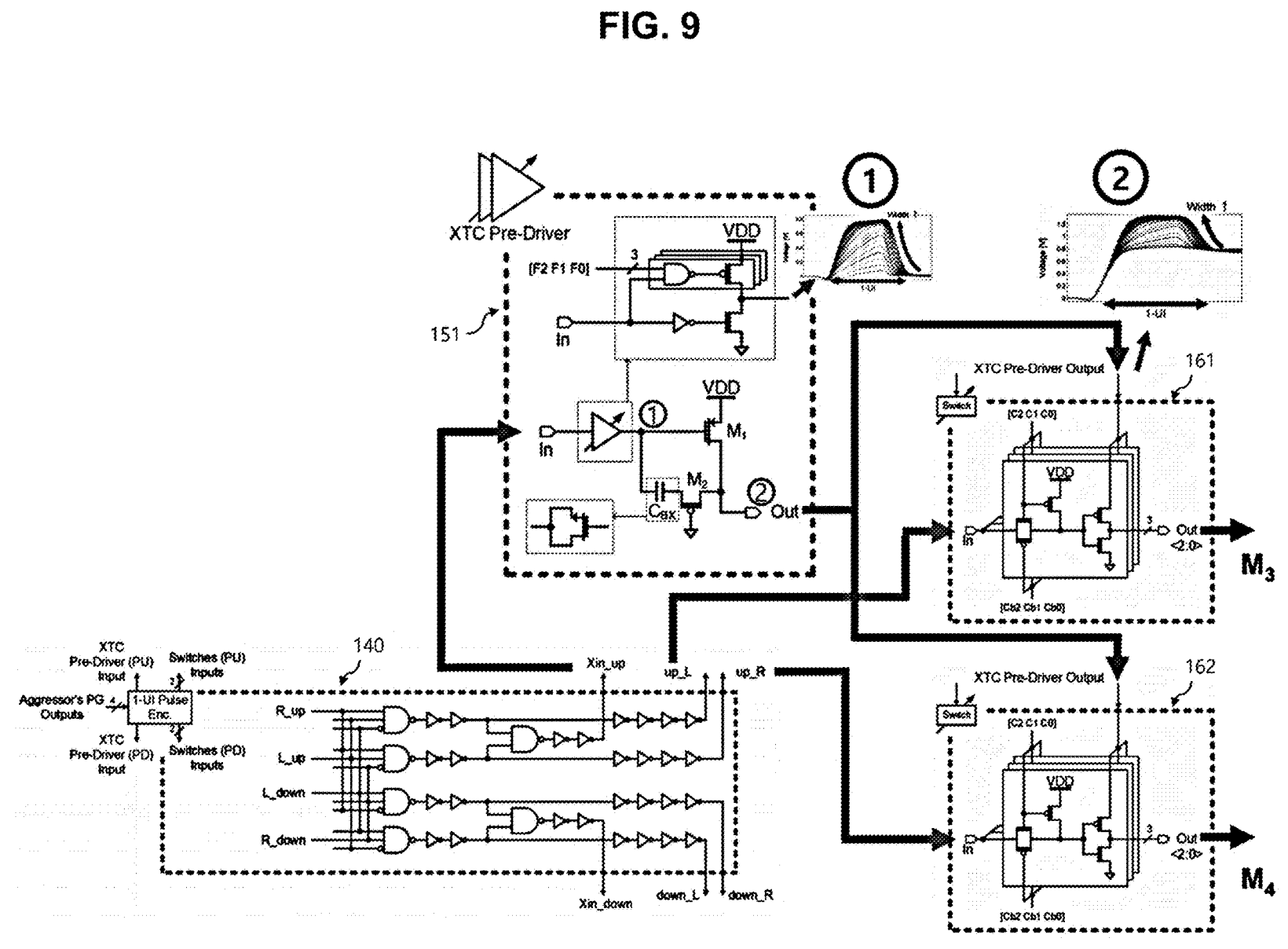

FIG. 9 is a diagram for describing an example of a pull-up situation, according to an embodiment.

Referring to FIG. 9, it may be seen that an example of attenuating channel interference by increasing output when the victim channel 210 is interfered with by at least one of the first aggressor channel 221 and the second aggressor channel 222.

The inter-channel interference attenuation circuit system 1 according to an embodiment may have programmability of crosstalk compensation current. In the case of the conventional art, the coefficient of the current that compensates for crosstalk is determined in advance in the encoder, so it is structurally difficult to appropriately attenuate crosstalk interference for various types of the channels 200.

Compared to the conventional art, the inter-channel interference attenuation circuit system 1 according to an embodiment may programmably change the current that compensates for crosstalk, as illustrated, so it may be applied to various types of highly integrated channels. For example, a High Bandwidth Memory (HBM) interface includes the channel 200 for exchanging data through the through silicon via (TSV) inside the memory 300, and the silicon interposer channel 200 that connects the memory and the computing unit (CPU/GPU/NPU, etc.), and the inter-channel interference attenuation circuit system 1 according to an embodiment may adjust the current that compensates for crosstalk according to channel characteristics, so versatility may be greater.

A fine tuning digital code ([F2 F1 F0]) is a 3-bit digital code and may be a digital code for fine tuning XTC strength.

The range adjustment digital codes ([C2 C1 C0] and [Cb2 Cb1 Cb0]) are each 3-bit digital codes, the XTC strength may be coarse tuned to a relatively large range compared to the fine tuning using any one 3-bit digital code ([C2 C1 C0]) and its opposite 3-bit digital code [Cb2 Cb1 Cb0].

For example, by using the driving strength of the third switching element (M3) 113 and the fourth switching element (M4) 114, each composed of three transistors of different sizes, the fine tuning and the coarse tuning of the up pre-driver 151 or the down pre-driver 152 and the switch module may be performed.

The switch module may include the first up switch module 161, the second up switch module 162, the first down switch module 171, and the second down switch module 172.

When the first up switch input signal up_L from the pulse encoder 140 is received while the strength control signal from the up pre-driver 151 is received, the first up switch module 161 may generate the third control signal with a level corresponding to the strength control signal and the range adjustment digital code so as to be transmitted to the gate terminal of the third switching element 113.

When the second up switch input signal up_R from the pulse encoder 140 is received while the strength control signal from the up pre-driver 151 is received, the second up switch module 162 may generate the fourth control signal with a level corresponding to the strength control signal and the range adjustment digital code so as to be transmitted to the gate terminal of the fourth switching element 114.

When the first down switch input signal down_L from the pulse encoder 140 is received while the strength control signal from the down pre-driver 152 is received, the first down switch module 171 may generate the fifth control signal with a level corresponding to the strength control signal and the range adjustment digital code so as to be transmitted to the gate terminal of the fifth switching element 115.

When the second down switch input signal down_R from the pulse encoder 140 is received while the strength control signal from the down pre-driver 152 is received, the second down switch module 172 may generate the sixth control signal with a level corresponding to the strength control signal and the range adjustment digital code so as to be transmitted to the gate terminal of the sixth switching element 116.

Figure 10:
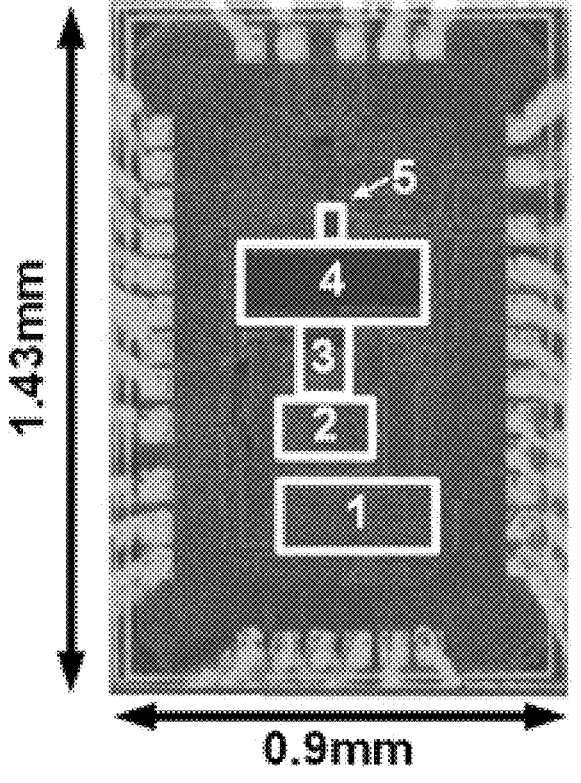
FIG. 10 is a diagram for describing problems of a transmitter based on a crosstalk cancellation circuit to which a conventional art is applied.
Figure 10:
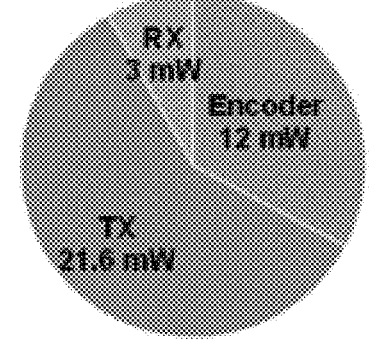

FIG. 10 is a diagram for describing problems of a transmitter based on a crosstalk cancellation circuit to which a conventional art is applied.

Referring to FIG. 10, in the case of the conventional art, it may be seen that the encoder, which is digital logic that calculates the amount of current required to compensate for crosstalk between channels, is relatively large, occupies a large area, and consumes a large amount of power.

In detail, the transmitter based on the inter-channel interference cancellation circuit to which the illustrated conventional art is applied may have the problem of consuming additional power of up to 55% of the power consumption of the transmitter and area overhead of 5062 μm^2 per channel.

The crosstalk cancellation method proposed in the conventional art occupies a large area and consumes a lot of power, so it may be difficult to apply the crosstalk cancellation method to the High Bandwidth Memory (HBM), which is a stacked memory product that actually arranges thousands of channels 200 at intervals of tens of μm.

Figure 11:
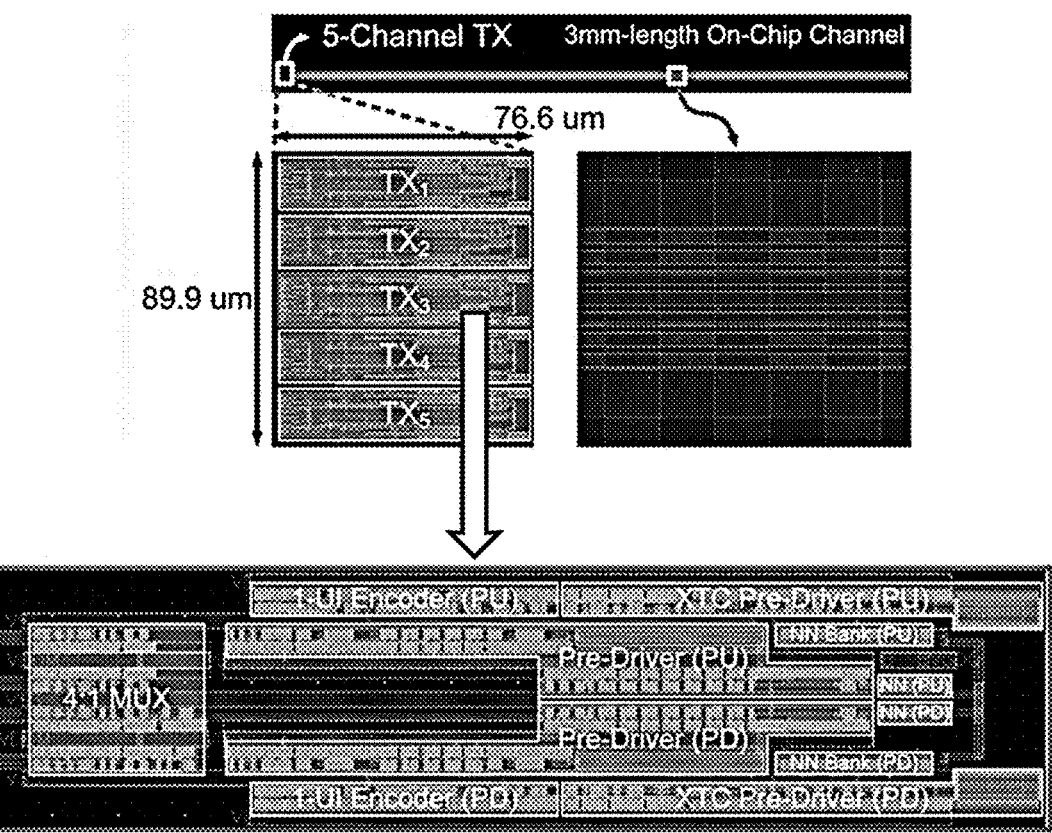
FIG. 11 is a diagram for describing features of a crosstalk cancellation circuit, according to an embodiment.

FIG. 11 is a diagram for describing features of a crosstalk cancellation circuit, according to an embodiment.

Referring to FIG. 11, the inter-channel interference attenuation circuit system 1 according to an embodiment may enable a circuit scheme and a circuit implementation that may effectively reduce the large area/power consumption overhead of inter-channel crosstalk cancellation, which is a problem of the conventional art. In detail, as a result of implementing the optimized circuit by applying the proposed crosstalk cancellation scheme, it may be seen that the area of one transmitter is significantly reduced to 1377 μm^2.

FIG. 12 is a table comparing performance of a crosstalk cancellation circuit, according to a conventional art and an embodiment.

Referring to FIG. 12, a table illustrating the results of direct comparison between the inter-channel interference attenuation circuit (This work) according to an embodiment and a conventional art ISSCC'20 may be confirmed.

It may be seen that the inter-channel interference attenuation circuit according to one embodiment and the conventional art ISSCC'20 achieve similar crosstalk cancellation performance while significantly improving energy efficiency and area efficiency.

In addition, it may be confirmed that the inter-channel interference attenuation circuit according to an embodiment is a technology that is differentiated from the conventional art in that it allows adjustment of crosstalk cancellation.

According to an embodiment of the present disclosure, signal quality may be improved by removing or attenuating inter-channel interference.

According to an embodiment of the present disclosure, a circuit capable of removing or attenuating inter-channel interference may be implemented with low power and a small area compared to the conventional art.

According to an embodiment of the present disclosure, the attenuation of inter-channel interference phenomenon may be adjusted compared to the conventional art.

As above, the disclosed embodiments have been described with reference to the accompanying drawings. At least one component may be added or omitted depending on the performance of the described components. Also, it should be easily understood by one skilled in the art that mutual locations of components may be changed depending on the performance or the structure of the system.

Those skilled in the art to which the present disclosure pertains will be understood that the present disclosure may be implemented in a form different from the disclosed embodiments without changing the technical spirit or essential features of the present disclosure. The disclosed embodiments are illustrative and should not be construed as limiting.

What is claimed is:

1. An inter-channel interference attenuation circuit system comprising:

a plurality of channels provided between a memory and a processor and configured to transmit data received from the memory to the processor; and an interference attenuation circuit module connected one by one to each of the channels, and wherein each of the channels is:

a victim channel with respect to the connected interference attenuation circuit module; and an aggressive channel with respect to an adjacent interference attenuation circuit module, which is an inter-ference attenuation circuit module connected to an adjacent channel which is interfered with by its own data transmission, and each of the interference attenuation circuit modules is configured to:

adjust an output signal of the connected victim channel based on the interference attenuation circuit module and the number of adjacent channels which are aggressive channels with respect to the victim channel and whose transmitted data changes from '0' to '1'; and adjust the output signal of the connected victim channel based on the interference attenuation circuit module and the number of adjacent channels which are aggressive channels with respect to the victim channel and whose transmitted data changes from '1' to '0', and wherein the each of the interference attenuation circuit modules is configured to:

receive an encoder input signal generated by the data transmission of the each aggressive channel from the adjacent interference attenuation circuit module connected to at least one aggressive channel with respect to the connected victim channel; and adjust the output signal of the connected victim channel based on the at least one received encoder input signal.

2. The inter-channel interference attenuation circuit system of claim 1, wherein the each of the interference attenuation circuit modules is configured to:

when data transmitted by a first aggressive channel with respect to the connected victim channel changes from '0' to '1', receive a first up encoder input signal from a first adjacent interference attenuation circuit module, which is an adjacent interference attenuation circuit module connected to the first aggressive channel;

when the data transmitted by the first aggressive channel with respect to the connected victim channel changes from '1' to '0', receive a first down encoder input signal from the first adjacent interference attenuation circuit module;

when data transmitted by a second aggressive channel with respect to the connected victim channel changes from '0' to '1', receive a second up encoder input signal from a second adjacent interference attenuation circuit module, which is an adjacent interference attenuation circuit module connected to the second aggressive channel; and when the data transmitted by the second aggressive channel with respect to the connected victim channel changes from '1' to '0', receive a second down encoder input signal from the second adjacent interference attenuation circuit module.

3. The inter-channel interference attenuation circuit system of claim 2, wherein the each of the interference attenuation circuit modules further includes:

a first switching element provided between an output node connected to the corresponding victim channel and a first voltage source; and a second switching element provided between the output node and a first ground, and wherein the first switching element is configured to:

electrically connect the first voltage source to the output node depending on a first control signal generated based on data received by a data input terminal which receives data to be transmitted to the victim channel from the memory, and wherein the second switching element is configured to:

electrically connect the output node to the first ground depending on a second control signal generated based on data received by the data input terminal.

4. The inter-channel interference attenuation circuit system of claim 3, wherein the each of the interference attenuation circuit modules further includes:

a third switching element provided between the output node and a second voltage source;

a fourth switching element provided between the output node and the second voltage source;

a fifth switching element provided between the output node and a second ground; and a sixth switching element provided between the output node and the second ground, and wherein the third switching element is configured to:

electrically connect the second voltage source to the output node depending on a third control signal generated based on the encoder input signals, wherein the fourth switching element is configured to:

electrically connect the second voltage source to the output node depending on a fourth control signal generated based on the encoder input signals, wherein the fifth switching element is configured to:

electrically connect the second ground to the output node depending on a fifth control signal generated based on the encoder input signals, and wherein the sixth switching element is configured to:

electrically connect the second ground to the output node depending on a sixth control signal generated based on the encoder input signals.

5. The inter-channel interference attenuation circuit system of claim 4, wherein the each of the interference attenuation circuit modules is configured to:

generate the third control signal, the fourth control signal, the fifth control signal, and the sixth control signal, based on whether the first up encoder input signal is received, whether the first down encoder input signal is received, whether the second up encoder input signal is received, and whether the second down encoder input signal is received, respectively.

6. The inter-channel interference attenuation circuit system of claim 5, wherein the each of the interference attenuation circuit modules is configured to:

generate the third control signal when the first down encoder input signal from the first adjacent interference attenuation circuit module is received and the second up encoder input signal from the second adjacent interference attenuation circuit module is not received;

generate the fourth control signal when the second down encoder input signal from the second adjacent interference attenuation circuit module is received and the first up encoder input signal from the first adjacent interference attenuation circuit module is not received;

generate the fifth control signal when the first up encoder input signal from the first adjacent interference attenuation circuit module is received and the second down encoder input signal from the second adjacent interference attenuation circuit module is not received; and generate the sixth control signal when the second up encoder input signal is received from the second adjacent interference attenuation circuit module and the first down encoder input signal is not received from the first adjacent interference attenuation circuit module.

7. The inter-channel interference attenuation circuit system of claim 6, wherein the each of the interference attenuation circuit modules further includes:

an up signal generating driver provided between a gate terminal of the first switching element and the data input terminal and configured to generate an up encoder input signal based on a change in data received through the data input terminal; and a down signal generating driver provided between a gate terminal of the second switching element and the data input terminal and configured to generate a down encoder input signal based on the change in the data received through the data input terminal.

8. The inter-channel interference attenuation circuit system of claim 7, wherein the each of the interference attenuation circuit modules is configured to:

receive the first up encoder input signal from the up signal generating driver of the first adjacent interference attenuation circuit module;

receive the first down encoder input signal from the down signal generating driver of the first adjacent interference attenuation circuit module;

receive the second up encoder input signal from the up signal generating driver of the second adjacent interference attenuation circuit module; and receive the second down encoder input signal from the down signal generating driver of the second adjacent interference attenuation circuit module.

9. The inter-channel interference attenuation circuit system of claim 8, wherein the each of the interference attenuation circuit modules further includes:

a pulse encoder configured to generate a driver input signal and a switch input signal based on the encoder input signal;

at least one pre-driver electrically connected to the pulse encoder and configured to generate a strength control signal with a magnitude corresponding to a fine-tuning digital code when the fine-tuning digital code and the driver input signal are received; and at least one switch module electrically connected to the pulse encoder and the pre-driver, and configured to generate a control signal with a magnitude corresponding to the strength control signal and a range adjustment digital code when the strength control signal, the range adjustment digital code, and the switch input signal are received.

10. The inter-channel interference attenuation circuit system of claim 9, wherein the pre-driver includes:

an up pre-driver and a down pre-driver, and wherein the pulse encoder is configured to:

when the interference attenuation circuit module receives at least one of the first up encoder input signal and the second up encoder input signal, transmit the driver input signal to the up pre-driver; and when the interference attenuation circuit module receives at least one of the first down encoder input signal and the second down encoder input signal, transmit the driver input signal to the down pre-driver.

11. The inter-channel interference attenuation circuit system of claim 10, wherein the pulse encoder is configured to:

when the first down encoder input signal is received and the second up encoder input signal is not received, generate a first up switch input signal;

when the second down encoder input signal is received and the first up encoder input signal is not received, generate a second up switch input signal;

when the first up encoder input signal is received and the second down encoder input signal is not received, generate a first down switch input signal; and when the second up encoder input signal is received and the first down encoder input signal is not received, generate a second down switch input signal.

12. The inter-channel interference attenuation circuit system of claim 11, wherein the switch module includes:

a first up switch module and a second up switch module, and wherein the first up switch module is configured to:

when the strength control signal from the up pre-driver is received and the first up switch input signal from the pulse encoder is received, generate the third control signal with a magnitude corresponding to the strength control signal and the range adjustment digital code so as to be transmitted to a gate terminal of the third switching element, and wherein the second up switch module is configured to:

when the strength control signal from the up pre-driver is received and the second up switch input signal from the pulse encoder is received, generate the fourth control signal with a magnitude corresponding to the strength control signal and the range adjustment digital code so as to be transmitted to a gate terminal of the fourth switching element.

13. The inter-channel interference attenuation circuit system of claim 11, wherein the switch module includes:

a first down switch module and a second down switch module, and wherein the first down switch module is configured to:

when the strength control signal from the down pre-driver is received and the first down switch input signal from the pulse encoder is received, generate the fifth control signal with a magnitude corresponding to the strength control signal and the range adjustment digital code so as to be transmitted to a gate terminal of the fifth switching element, and wherein the second down switch module is configured to:

when the strength control signal from the down pre-driver is received and the second down switch input signal from the pulse encoder is received, generate the sixth control signal with a magnitude corresponding to the strength control signal and the range adjustment digital code so as to be transmitted to a gate terminal of the sixth switching element.

* * * * *